(12) United States Patent
Ershov

(10) Patent No.: US 8,533,130 B2
(45) Date of Patent: Sep. 10, 2013

(54) USE OF NEURAL NETWORKS FOR ANNOTATING SEARCH RESULTS

(75) Inventor: Alexander V. Ershov, Sergiev Posad (RU)

(73) Assignee: Dranias Development LLC, Wilmington, DE (US)

( * ) Notice: Subject to any disclaimer, the term of this patent is extended or adjusted under 35 U.S.C. 154(b) by 776 days.

(21) Appl. No.: 12/618,733

(22) Filed: Nov. 15, 2009

(65) Prior Publication Data

US 2011/0047111 A1 Feb. 24, 2011

Related U.S. Application Data

(63) Continuation of application No. 11/535,306, filed on Sep. 26, 2006, now Pat. No. 7,620,607, and a continuation-in-part of application No. 12/327,422, filed on Dec. 3, 2008, now Pat. No. 8,229,948, which is a continuation of application No. 11/468,692, filed on Aug. 30, 2006, now Pat. No. 7,475,072.

(60) Provisional application No. 60/719,975, filed on Sep. 26, 2005, provisional application No. 60/735,858, filed on Nov. 14, 2005, provisional application No. 60/723,935, filed on Oct. 6, 2005.

(51) Int. Cl.
*G06F 15/18* (2006.01)
(52) U.S. Cl.
USPC ......................................................... 706/12
(58) Field of Classification Search
None
See application file for complete search history.

(56) References Cited

U.S. PATENT DOCUMENTS

| 5,086,479 | A | 2/1992 | Takenaga et al. |
| 5,506,937 | A | 4/1996 | Ford et al. |
| 5,535,303 | A | 7/1996 | Ekchian et al. |
| 5,546,503 | A | 8/1996 | Abe et al. |
| 5,546,529 | A | 8/1996 | Bowers et al. |
| 5,548,683 | A | 8/1996 | Engel et al. |
| 5,619,709 | A | 4/1997 | Caid et al. |
| 5,794,178 | A | 8/1998 | Caid et al. |
| 5,812,134 | A | 9/1998 | Pooser et al. |
| 5,819,245 | A | 10/1998 | Peterson et al. |
| 5,937,084 | A | 8/1999 | Crabtree et al. |
| 5,963,965 | A | 10/1999 | Vogel |
| 5,966,126 | A | 10/1999 | Szabo |

(Continued)

OTHER PUBLICATIONS

Notice of Allowance on U.S. Appl. No. 12/327,422, mailed Mar. 2, 2012.

(Continued)

*Primary Examiner* — Li-Wu Chang

(57) ABSTRACT

A system for generating annotations of a document, including a plurality of neurons connected as a neural network, the neurons being associated with words, sentences and documents. An activity regulator regulates a minimum and/or maximum number of neurons of the neural network that are excited at any given time. The neurons are displayed to a user and identify the neurons that correspond to sentences containing a predetermined percentage of document meaning. The annotations can be also based on a context of the user's search query. The query can include keywords, documents considered relevant by the user, or both. Positions of the neurons relative to each other can be changed on a display device, based on input from the user, with the change in position of one neuron changing the resulting annotations. The input from the user can also include changing a relevance of neurons relative to each other, or indicating relevance or irrelevance of a document or sentence.

21 Claims, 5 Drawing Sheets

(56) References Cited

U.S. PATENT DOCUMENTS

| | | | |
|---|---|---|---|
| 6,112,203 | A | 8/2000 | Bharat et al. |
| 6,138,128 | A | 10/2000 | Perkowitz et al. |
| 6,166,739 | A | 12/2000 | Hugh |
| 6,167,398 | A | 12/2000 | Wyard et al. |
| 6,189,002 | B1 | 2/2001 | Roitblat |
| 6,233,575 | B1 | 5/2001 | Agrawal et al. |
| 6,256,623 | B1 | 7/2001 | Jones |
| 6,263,335 | B1 | 7/2001 | Paik et al. |
| 6,304,864 | B1 | 10/2001 | Liddy et al. |
| 6,336,112 | B2 | 1/2002 | Chakrabarti et al. |
| 6,385,602 | B1 | 5/2002 | Tso et al. |
| 6,463,423 | B1 | 10/2002 | Wada |
| 6,513,036 | B2 | 1/2003 | Fruensgaard et al. |
| 6,574,632 | B2 | 6/2003 | Fox et al. |
| 6,615,197 | B1 | 9/2003 | Chai |
| 6,633,868 | B1 | 10/2003 | Min et al. |
| 6,636,853 | B1 | 10/2003 | Stephens, Jr. |
| 6,640,302 | B1 | 10/2003 | Subramaniam et al. |
| 6,725,217 | B2 | 4/2004 | Chow et al. |
| 6,748,375 | B1 | 6/2004 | Wong et al. |
| 6,801,229 | B1 | 10/2004 | Tinkler |
| 6,829,428 | B1 | 12/2004 | Quintos |
| 6,868,525 | B1 | 3/2005 | Szabo |
| 6,931,604 | B2 | 8/2005 | Lane |
| 6,938,034 | B1 | 8/2005 | Kraft et al. |
| 6,961,731 | B2 | 11/2005 | Holbrook |
| 6,999,959 | B1 | 2/2006 | Lawrence et al. |
| 7,054,870 | B2 | 5/2006 | Holbrook |
| 7,152,064 | B2 | 12/2006 | Bourdoncle et al. |
| 7,181,438 | B1 | 2/2007 | Szabo |
| 7,248,191 | B2 | 7/2007 | Tanaka et al. |
| 7,251,637 | B1 | 7/2007 | Caid et al. |
| 7,284,191 | B2 | 10/2007 | Grefenstette et al. |
| 7,296,009 | B1 | 11/2007 | Jiang et al. |
| 7,337,398 | B1 | 2/2008 | Thrall et al. |
| 7,437,370 | B1 | 10/2008 | Ershov |
| 7,496,548 | B1 | 2/2009 | Ershov |
| 7,529,743 | B1 | 5/2009 | Ershov |
| 7,530,020 | B2 | 5/2009 | Szabo |
| 7,536,316 | B2 | 5/2009 | Ozer et al. |
| 7,555,478 | B2 | 6/2009 | Bayley et al. |
| 7,565,627 | B2 | 7/2009 | Brill et al. |
| 7,575,659 | B2 | 8/2009 | Billings |
| 7,584,175 | B2 | 9/2009 | Patterson |
| 7,610,195 | B2 | 10/2009 | Ojanpera |
| 7,620,607 | B1 | 11/2009 | Ershov |
| 7,627,582 | B1 | 12/2009 | Ershov |
| 7,778,946 | B2 | 8/2010 | Hercus |
| 8,001,105 | B2 | 8/2011 | Bolivar et al. |
| 8,296,127 | B2* | 10/2012 | Marcu et al. ........................ 704/5 |
| 2002/0016782 | A1* | 2/2002 | Cooper ........................ 706/15 |
| 2002/0042741 | A1 | 4/2002 | Wilson et al. |
| 2002/0042750 | A1 | 4/2002 | Morrison |
| 2002/0154167 | A1 | 10/2002 | Parsons et al. |
| 2002/0156702 | A1 | 10/2002 | Kane |
| 2002/0174101 | A1* | 11/2002 | Fernley et al. ........................ 707/1 |
| 2003/0069873 | A1 | 4/2003 | Fox et al. |
| 2003/0212663 | A1 | 11/2003 | Leno et al. |
| 2003/0212669 | A1 | 11/2003 | Dedhia et al. |
| 2003/0216919 | A1 | 11/2003 | Roushar |
| 2004/0015408 | A1 | 1/2004 | Rauen et al. |
| 2004/0078268 | A1 | 4/2004 | Sprogis |
| 2004/0083206 | A1 | 4/2004 | Wu et al. |
| 2004/0111319 | A1 | 6/2004 | Matsumoto et al. |
| 2004/0172378 | A1 | 9/2004 | Shanahan et al. |
| 2004/0181547 | A1 | 9/2004 | Mazzagatti |
| 2004/0225722 | A1 | 11/2004 | Jeong |
| 2005/0022114 | A1* | 1/2005 | Shanahan et al. ........................ 715/513 |
| 2005/0080776 | A1 | 4/2005 | Colledge et al. |
| 2005/0086186 | A1 | 4/2005 | Sullivan et al. |
| 2005/0132305 | A1 | 6/2005 | Guichard et al. |
| 2005/0144158 | A1 | 6/2005 | Capper et al. |
| 2005/0165747 | A1 | 7/2005 | Bargeron et al. |
| 2005/0165766 | A1 | 7/2005 | Szabo |
| 2005/0246296 | A1 | 11/2005 | Ma et al. |
| 2005/0278443 | A1 | 12/2005 | Winner et al. |
| 2006/0069617 | A1 | 3/2006 | Milener et al. |
| 2006/0085395 | A1 | 4/2006 | Cradick et al. |
| 2006/0106793 | A1 | 5/2006 | Liang |
| 2006/0149721 | A1 | 7/2006 | Langford |
| 2006/0190285 | A1 | 8/2006 | Harris et al. |
| 2006/0190812 | A1 | 8/2006 | Ellenby et al. |
| 2006/0195442 | A1 | 8/2006 | Cone et al. |
| 2006/0200445 | A1 | 9/2006 | Chen et al. |
| 2006/0200461 | A1 | 9/2006 | Lucas et al. |
| 2006/0218522 | A1 | 9/2006 | Hanechak |
| 2006/0265417 | A1 | 11/2006 | Amato et al. |
| 2006/0287919 | A1 | 12/2006 | Rubens et al. |
| 2006/0287985 | A1 | 12/2006 | Castro et al. |
| 2006/0288023 | A1 | 12/2006 | Szabo |
| 2006/0294094 | A1 | 12/2006 | King et al. |
| 2007/0009151 | A1 | 1/2007 | Pittman et al. |
| 2007/0011150 | A1 | 1/2007 | Frank |
| 2007/0022068 | A1* | 1/2007 | Linsker ........................ 706/23 |
| 2007/0073580 | A1 | 3/2007 | Perry et al. |
| 2007/0073591 | A1 | 3/2007 | Perry et al. |
| 2007/0156677 | A1 | 7/2007 | Szabo |
| 2007/0192164 | A1 | 8/2007 | Nong et al. |
| 2007/0192281 | A1 | 8/2007 | Cradick et al. |
| 2007/0192306 | A1 | 8/2007 | Papakonstantinou et al. |
| 2007/0198951 | A1 | 8/2007 | Frank |
| 2007/0204238 | A1 | 8/2007 | Hua |
| 2007/0214415 | A1 | 9/2007 | Williams |
| 2007/0219940 | A1 | 9/2007 | Mueller et al. |
| 2007/0239541 | A1 | 10/2007 | Kane et al. |
| 2007/0255671 | A1 | 11/2007 | Fox et al. |
| 2007/0294641 | A1 | 12/2007 | Rashkovskiy |
| 2008/0046406 | A1 | 2/2008 | Seide et al. |
| 2008/0052638 | A1 | 2/2008 | Frank et al. |
| 2008/0177717 | A1 | 7/2008 | Kumar et al. |

OTHER PUBLICATIONS

Final Office Action on U.S. Appl. 12/327,422, mailed Oct. 25, 2011.
Dursteler, Juan C., InfoVis, http/infovis.net/printMag.php?num=97&lang=2, KartOO, Aug. 19, 2002.
Rizzo et al., "Spatial Organization using self-organizing Neural Networks",, 2002.
Powers et al., "The magic Science of visualization", 2003.
Tamara Munzner, Visualizing the structure of the world wide web in 3D hyperbolic space, ACM, 1995.
Nicholas G. Tomaiuolo, "Answers.com and Xrefer: The Chevy and Bimmer of Ready reference", Jul./Aug. 2005.
Dittenbach et al., "Using a Connectionist Approach for Enhancing Domain Ontologies: Self-Organizing word category maps revised", 2003.
"A divergent-style learning support tool for english learners using a thesaurus diagram", Kes 2006, part III, LNAI 4253, pp. 867-874.
www.visualthesaurus.com (user manuel), Oct. 18, 2000, pp. 1-23.
Kwok, A Neural Network for Probabilistic Information Retrieval, 1989.
Bengio, A Neural Probabilistic Language Model 2001.
He, "Neural Network and Its Application in IR", 1999.
Bendord et al., Three Dimensional Visualization of the World Wide Web, 2000, ACM, pp. 1-16.
Nejad, A & Gedeon, T. "Bidirectional Neural Network and Class Prototypes", IEEE Conf. Neural Networks, 1995, pp. 1322-1327.
Yusoff "Artificial Neural Networks (ANN) and Its Application in Engineering", http://ppt.ump.edu.my/images/mech/ANN.pdf.
Merkl "Text classification with self-organizing maps: Some lessons learned", Neurocomputing 21 (1998) pp. 61-77.
Bonnyman et al. "A Neural Network Application for the Analysis and Synthesis of Multilingual Speech", 1994, SIPNN, pp. 13-16.
Paralic et al. "Text Mining for Documents Annotation and Ontology Support", http://people.tuke.sk/jan.paralic/papers/BookChapter.pdf.
Brause et al. "Transform Coding by Lateral Inhibited Neural Nets", Porc. IEEE TAI, 1993, pp. 14-21.
Merkl., "Text classification with self-organizing maps: Some lessons learned", Neurocomputing 21 (1998) pp. 61-77.
Bloehdorn et al., "Semantic Annotation of Images and Videos for Multimedia Analysis", ESWC 2005.

Golstev et al., "An Assembly Neural Network for Texture Segmentation," Neural Networks, vol. 9, No. 4, Jun. 1996, pp. 643-653.

Golstev, et al., "Inhibitory Connections in the Assembly Neural Network for Texture Segmentation," Neural Networks, vol. 11, No. 5, Jul. 1998, pp. 951-962.

Kussul et al., "Structure of Neural Assembly," Neuroinformatics and Neurocomputers, RNNS/IEEE Symposium Oct. 7-10, 1992, vol. 1, pp. 423-434.

El-Kwae, et al., "Tug-Of-War: A Simple 2D Web Visualization Technique," Proceedings SPIE vol. 4665, Visualization and Data Analysis 2002, pp. 207-217.

Fagan, Jody Condit, "Basic Search and Visual Search: Usability Tests with EBSCOhost," Electronic Resources & Libraries conference, Mar. 24, 2006, 62 pages.

Final Office Action on U.S. Appl. No. 12/472,204, mailed Apr. 27, 2011.

Hamalainen et al., "TUTNC: a general purpose parallel computer for neural network computations," Microprocessors and Microsystems vol. 19, No. 8, Oct. 1995, pp. 447-465.

Jones, Steve, "Graphical Query Specification and Dynamic Result Previews for a Digital Library," Symposium on User Interface Software and Technology Archive, Proceedings of the 11th Annual ACM symposium on User Interface Software and Technology, Table of Contents, Year of Publication, 1998, pp. 143-151.

Non-Final Office Action on U.S. Appl. No. 12/234,751, mailed Mar. 17, 2011.

Non-Final Office Action on U.S. Appl. No. 12/327,422, mailed May 9, 2011.

Non-Final Office Action on U.S. Appl. No. 11/468,692, mailed May 13, 2008.

Non-Final Office Action on U.S. Appl. No. 12/362,017, mailed Nov. 24, 2009.

Non-Final Office Action on U.S. Appl. No. 12/416,210, mailed Mar. 24, 2011.

Notice of Allowance on U.S. Appl. No. 12/362,017, mailed Mar. 8, 2011.

Shmelev et al., Equilibrium Points of Single-Layered Neural Networks with Feedback and Applications in the Analysis of Text Documents, pp. 164-170, 2005.

Tomita et al., "Interactive Web Search by Graphical Query Refinement," Poster Proceedings of the 10th International World Wide Web Conference (WWW10), 5 pages, 2001.

Final Office Action on U.S. Appl. No. 12/234,751, mailed Sep. 6, 2011.

Non-Final Office Action on U.S. Appl. No. 12/416,210, mailed Sep. 19, 2011.

Notice of Allowance on U.S. Appl. No. 12/472,204, mailed Aug. 10, 2011.

Non-Final Office Action on U.S. Appl. No. 12/472,204, mailed Oct. 6, 2010.

Non-Final Office Action on U.S. Appl. No. 12/234,751, mailed Sep. 10, 2012.

Final Rejection on U.S. Appl. No. 12/234,751, mailed Mar. 8, 2013.

Notice of Allowance on U.S. Appl. No. 12/234,751, mailed May 17, 2013.

* cited by examiner

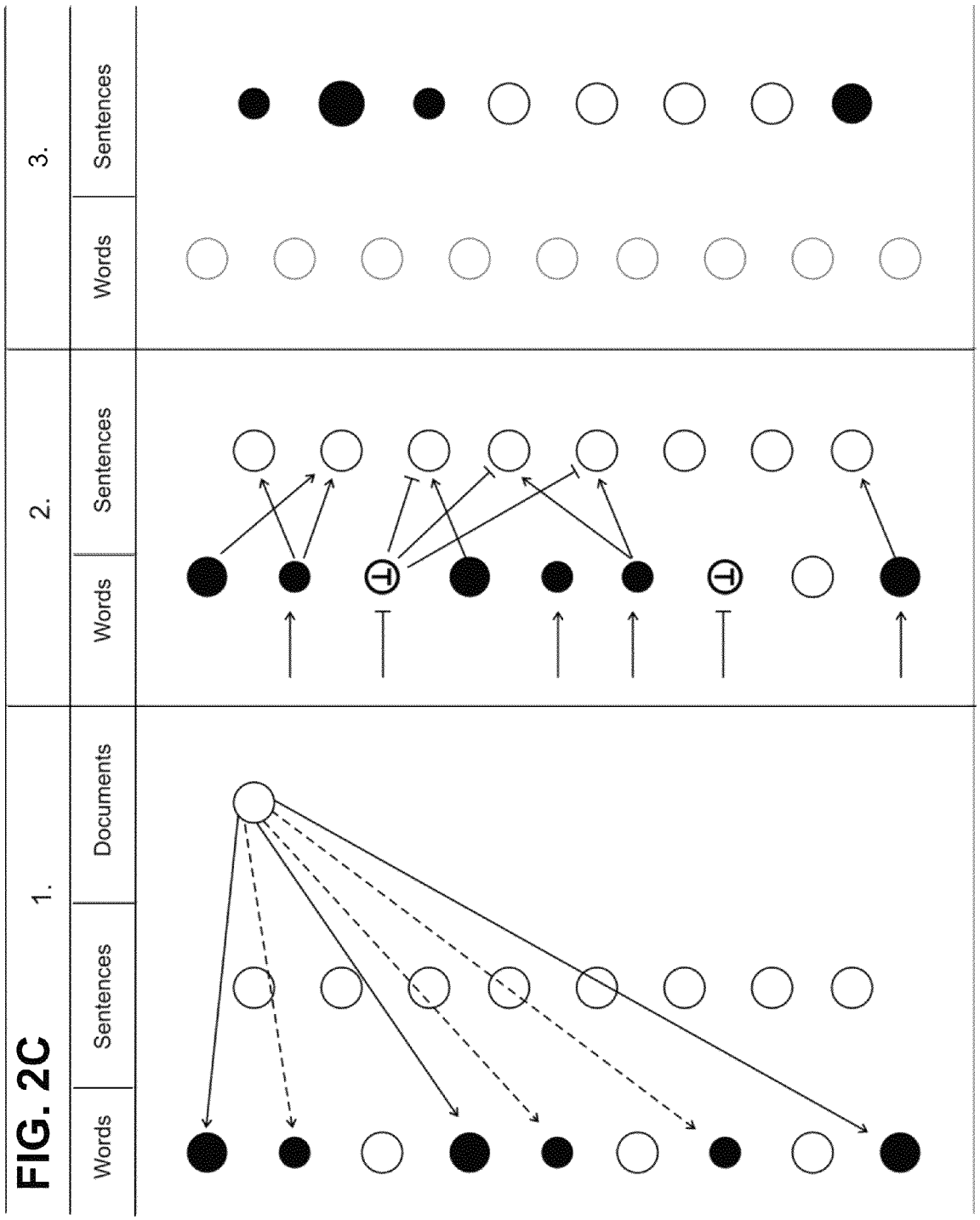

USE OF NEURAL NETWORKS FOR ANNOTATING SEARCH RESULTS

CROSS-REFERENCE TO RELATED APPLICATIONS

This application is a continuation of U.S. patent application Ser. No. 11/535,306 (now U.S. Pat. No. 7,620,607), filed Sep. 26, 2006, entitled USE OF NEURAL NETWORKS FOR ANNOTATING SEARCH RESULTS, which claims the benefit of U.S. Provisional patent Application No. 60/723, 935, filed on Oct. 6, 2005, entitled USE OF NEURAL NETWORKS FOR ANNOTATING SEARCH RESULTS, and of U.S. Provisional patent Application No. 60/719,975, filed on Sep. 26, 2005, entitled CONTEXT BASED SEARCH VISUALIZATION USING NEURAL NETWORKS which is incorporated by reference herein in their entirety.

This application is a continuation-in-part of U.S. patent application Ser. No. 12/327,422, filed on Dec. 3, 2008, which is a continuation of U.S. patent application Ser. No. 11/468, 692, filed on Aug. 30, 2006 (now U.S. Pat. No. 7,475,073), entitled CONTEXT-BASED SEARCH VISUALIZATION AND CONTEXT MANAGEMENT USING NEURAL NETWORKS, which claims the benefit of U.S. Provisional Patent Application No. 60/719,975, filed on Sep. 26, 2005, entitled CONTEXT-BASED SEARCH VISUALIZATION USING NEURAL NETWORKS, and of U.S. Provisional Patent Application No. 60/735,858, filed on Nov. 14, 2005, entitled ONE-CLICK SEARCH SYSTEM AND METHOD, which are all incorporated by reference herein in their entirety.

BACKGROUND OF THE INVENTION

1. Field of the Invention

The present invention relates to generation of annotations for documents and for search engine output results as a means for assisting a user in selecting relevant search results.

2. Description of the Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web pages. Web pages that contain the user's search terms are "hits" and are returned to the user.

The overriding goal of a search engine is to return the most desirable set of links for any particular search query. Annotation generation is one of the aspects of providing search results and managing the search process. Annotations are meant to summarize what the documents are "about"—conventionally they are sentences that are mentioned in the documents themselves, and which supposed by capture the meaning of the document.

Conventional search engines have two ways to specify the number of sentences in the annotations that they provide—one is a percentage of the total sentences in the document (e.g., 5% or 10%) or a maximum number of sentences that the user can specify (or, alternatively, a certain number of words before and after some word in the found text). Neither of these approaches is, in fact, satisfactory. For example, with very large documents, (e.g., 50 or 100 pages of text), specifying what appears to be a relatively low percentage (such as 10%) would still result in five or ten pages of text that the reader has to "digest."

The conventional solution to this is to give the user the flexibility to adjust the parameters of annotation—e.g., giving the user the ability to switch between percentages and fixed maximum number of sentences presented, and giving in the ability to adjust the actual values of the percentages or numbers of sentences. The disadvantage of this approach is that the user, instead of concentrating on the substance of his search, has to instead constantly manipulate parameters that are not directly related to the subject matter of his search—in other words he has to manipulate the parameters of what is displayed on the screen, rather than adjusting the search query itself.

Conventional search engines typically annotate their search results by producing a few (typically between one and three) sentences in which the words of the query are found. This does not necessarily produce the most relevant annotations. For example, a user searching for documents relating to the Boeing 787 Dreamliner can input, as his query, "Boeing 787 Dreamliner." One of the hits in response to such a query might be an article in a magazine about a completely unrelated subject, with a paragraph at the end of the article saying something to the effect "and in our next issue, look for a detailed discussion of the design process of the Boeing 787 Dreamliner." This sentence will be picked up by the search engine, and the document presented to the user (possibly with a relatively high ranking), even though the actual "meaning" of the document has nothing to do with the subject matter of the query.

Accordingly, there is a need in the art for a system and method for generating contextually relevant annotations.

SUMMARY OF THE INVENTION

Accordingly, the present invention is related to use of neural networks for annotation generation that substantially obviates one or more of the disadvantages of the related art.

In one aspect, there is provided a system, method and computer program product for generating annotations of a document, including a plurality of neurons connected as a neural network, the neurons being associated with words, sentences and documents. An activity regulator regulates a minimum and/or maximum number of neurons of the neural network that are excited at any given time. The neurons are displayed to a user and identify the neurons that correspond to sentences containing a predetermined percentage of document meaning. The annotations can be also based on a context of the user's search query. The query can include keywords, documents considered relevant by the user, or both. Positions of the neurons relative to each other can be changed on a display device, based on input from the user, with the change in position of one neuron changing the resulting annotations. The input from the user can also include changing relevance of neurons relative to each other.

The neural network can be a bidirectional network. The user can inhibit neurons of the neural network by indicating irrelevance of a neuron that represents a sentence. The neural network can be excited by a query that identifies a plurality of documents considered relevant by a user.

In another aspect, there is provided a method for generating annotations including forming a neural network from a plurality of layers. The layers include neurons corresponding to words, sentences and documents, and connections between the neurons. Neurons of the word layer are activated based on a document to be annotated. Relevance of the sentence neurons that correspond to the document is identified based on the activity of the neurons of the word layer. A subset of the active neurons of the sentence layer are selected as annotations, such that total activity of the selected neurons is above a predetermined threshold.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIGS. 2A-2C illustrates the dynamics of using a neural network, such as a network illustrated in FIG. 1, to generate annotations.

DETAILED DESCRIPTION OF THE PREFERRED EMBODIMENTS

Figure 1:
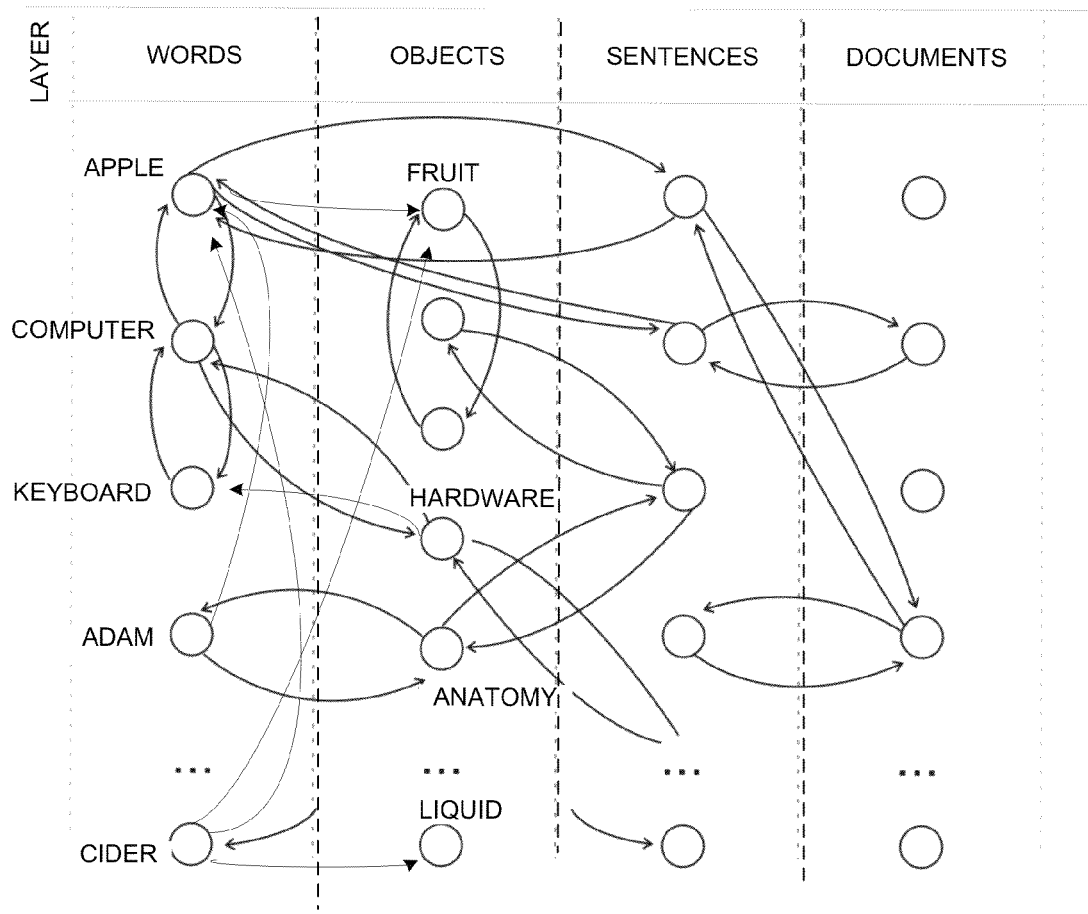
FIG. 1 shows a neural network according to one embodiment of the present invention.

Reference will now be made in detail to the embodiments of the present invention, examples of which are illustrated in the accompanying drawings.

Currently, the most widely known implementation of neural networks is referred to as a "back propagation neural network." This is a multi-layer neural network, where each layer typically consists of a set of neurons, and between each element of each layer there has to be a connection to every element of a next (or higher) layer. One of the most difficult problems in the field of neural networks is therefore the question of teaching the neural network, which, in mathematical terms, is translated to forming the coefficients of the connections between the neurons. Back propagation networks usually use a multi-cycle approach to gradually reduce the errors in the network, in other words, to gradually change the value of the coefficients of the connections. Note that the user needs to specify both the inputs and the desired outputs of the back propagation neural network. Well-known problems of this approach are a significant investment of time by the user into the learning process, as well as the fact that the "right" result is not guaranteed in a finite number of cycles.

The approach proposed herein uses neural networks with a certain topology that permits efficient and effective searching of documents and generation of relevant annotations. The approach described herein uses a set of neurons that are not connected to all other neurons on the same layer (or all other neurons on some other layer), but only to a subset of such neurons, and usually to a number of neurons that is dramatically less than the total number of neurons in the network.

The approach proposed herein uses neural networks with a certain topology that permits efficient and effective searching of documents. An example of such a network is described in U.S. patent application Ser. No. 11/468,048, entitled NEURAL NETWORK FOR ELECTRONIC SEARCH APPLICATIONS, Filed: Aug. 29, 2006, which is incorporated herein by reference in its entirety.

This approach also permits searching of documents that takes into account the context of the keywords and the "meaning" of the words, sentences, documents, clusters of words, documents, and so forth. The approach described herein uses a set of neurons that are not connected to all other neurons on the same layer (or to all other neurons on some other layer), but only to a subset of such neurons. In most cases, this subset will be dramatically less than the total number of neurons in the network.

A basic element of a neural network is, as noted above, a neuron, which has a set of parameters and a set of connections to other neurons. The parameter includes all the information necessary for the functioning of the neuron. The set of connections is essentially a set of identifiers (for example, numbers) of the neurons to which this particular neuron is connected, and the magnitude (weight) of the connection, and optionally some flags associated with the connections.

A neural network is defined by three primary factors—the configuration of the individual neurons, the configuration of the connections between the neurons, and the learning process that forms the connections. The neurons of the network described herein can be represented by a number of parameters. The first parameter is the ID of the neuron, which is essentially an administrative number used for keeping track of the neuron in the software. The second parameter is the layer to which this neuron belongs, usually a numeric parameter, such as 1 (words layer), 2 (object layer), 3 (sentence layer), and 4 (document layer). Another parameter is the semantic content of each neuron. For example, on the word layer, the semantic content of a neuron is the word itself ("apple," "cider"). On the object layer, the semantic content of each neuron is also a word or a group of words that represents the object or concept. On the sentence layer, the semantic content of each neuron is the sentence in a document. On the document layer, the semantic content of the neuron is the entire document, or some pointer to a document, such as a link or a hyperlink.

Another neuron parameter is the current excitation level of each neuron. This is a numeric value, which can be optionally normalized to be between −1 and +1. Another parameter (which is optional) is a measure of inertia $K_{ANCHOR}$, or "anchor." One of the issues that such a neural network may need to confront is the fact that some words in some languages often have numerous connections to other words, while others have only a few connections. In the case of words with many connections, those neurons would be easily excited, which in turn leads to a large amount of noise, or "junk stimuli" for other neurons. Therefore, the anchor is a numerical coefficient ranging between 0 and 1, used that makes it more difficult to excite a particular neuron. In essence, the anchor is used to suppress "junk excitation" for words which occur in a language with high frequency.

Another optional parameter is a coefficient of excitation $K_{EX}$, which is a numerical parameter between 0 and 1, and which relates to parts of speech. The default coefficient of excitation $K_{EX}$ may be 1.0 for all words, however, a more sophisticated approach would assign, for example, a coefficient of 1.0 to nouns, a coefficient of (for example) 0.7 to verbs, 0.5 to adverbs, etc.

Another parameter associated with each neuron is an inhibition coefficient $K_{INH}$. The inhibition coefficient is a measure of how long the neuron will stay excited, in terms of a number of cycles, in the absence of external stimulus. For example, if the current excitation level of the neuron is 1.0, and the inhibition coefficient is 0.5, then on the next cycle, and in the absence of external stimuli to that neuron, the excitation level of that neuron will be 0.5. On the cycle after that it will be 0.25, etc.

Another optional parameter is an exhaustion parameter $K_{EXH}$. This is a numerical value, ranging from 0 to 1, and is a measure of whether the neuron stays active from cycle to cycle, even if external stimuli are present (in other words, in some cases, it may be desirable to suppress the excitation of a particular neuron that otherwise would be excited all the time, even if external stimuli are present).

Another optional parameter is the threshold excitation value. Each neuron can be defined to have an excitation value of 0 if the excitation value is less than a certain threshold. This is also essentially a measure used to suppress noise and both "junk excitation" in the network, ensuring that only those neurons that have genuine relevance to the search are excited. This is also typically a parameter set by an expert based on empirical analysis.

Another parameter an activation function, $f_A$, where any number of different functions can be used, such as step, sigmoid, parabolic, sloping upwards, sloping downwards, etc. The function describes what the output of the neuron should look be given a particular total stimuli input.

Typically such control over the parameters is done under the guise of some on-screen control, that is presented in a more "user friendly" manner—for example, "scope of search," "level of detail," "number of most relevant results," etc.—these are all in some sense proxies for the parameters of the neural network that the user can set.

In addition to the parameters that relate to the neuron itself, each neuron also retains information relating to the connections that the neuron has. Typically, each neuron maintains the IDs of the neurons to which it is connected. As noted earlier, this is usually a subset of all the neurons, and usually a relatively small subset.

For each such connection, there is a connection weight, ranging between −1 and +1 (or some other number, here, −1 to +1 can be viewed as a normalized value). The connection weight normally changes dynamically, as the neural network evolves. A negative value for the weight of the coefficient represents an inhibition, or damping, of the excitation, a positive number represents an increase in the excitation. A zero may be viewed as a lack of connection between two neurons, meaning that they are never found in the same context.

This organization permits generation of a neural network of an arbitrarily large size, but at the same time permits very rapid forward and back propagation of information within the neural network.

To enable the neural network to function better, an Activity Regulator is used. In essence, the Activity Regulator is designed to maintain the overall activity within the neural network in a certain range. Once the overall activity is higher than a predetermined level, the activity of all the neurons is proportionately decreased. Similarly, if the overall activity is too low, it can be raised.

There are a number of Activity Regulators that can be used. For example, the Activity Regulator can maintain a maximum number of neurons of the network that are excited (e.g., 10% of the total). In the case of an under-excited network, i.e., one where virtually no neurons have been sufficiently excited, the Activity Regulator can be used to increase the overall level of activity, in the hope that neurons that are only weakly excited can be stimulated to a point where the network begins to function properly. The Activity Regular can maintain a minimum number of neurons, e.g., 1%, that are excited.

An object layer (which is not, strictly speaking, necessary, but helps with performance) has neurons that correspond to identified objects and their properties. Here, the word "apple" of layer 1 corresponds to three neurons in layer 2—a neuron associated with the "object" Apple Computer, a neuron associated with the object apple (the fruit), and a neuron that refers to the object "Adam's apple." This layer also can have word combinations as neurons. Note also that the object layer can be formed using dictionaries of objects, and, in the most comprehensive and most detailed case, would have a separate object for each possible meaning of the word—in other words, "apple" can be associated with hundreds of possible objects (fruit, computer, Macintosh—the computer, Macintosh the apple fruit, Big Apple, "the apple of my eye", "John's apple", "Mary's apple," etc.). This can be done based on "dictionaries" of objects. The more detailed the object layer, the more likely the neural network to give a focused, relevant result as the first few entries. At the other extreme, the object layer can be initially formed using simply the words encountered in a document—as such, a single object "apple" would be associated with multiple possible meanings.

Layer 2 is also optional, and so is the sentence layer (layer 3). In this layer, each neuron corresponds to a sentence in a document.

The fourth layer is a document layer, where each neuron in this layer corresponds to an indexed document. This layer is also optional, and, in fact, it is possible to have only a single layer, with the appropriate connections between the neurons. However, conceptually, it is easier to visualize the topology of the neural network in the form of multiple layers. Furthermore, the division into layers is to some extent arbitrary, since some word combinations can be put into layer 2 or layer 3, depending on the task. In many cases, two layers, a word layer and a document layer, are sufficient for effectively searching through the document. The connections can be formed in either direction (forward and back), and excitation/inhibition can propagate both forward (layer 1 to layers 2, 3 and 4, from layer 2 to layers 3 and 4, etc.) and back (from layer 4 to layers 3, 2, 1, from layer 3 to layers 2 and 1, etc.). Furthermore, it will be appreciated that the network can be implemented (in minimal form) using either the word layer and the document layer (layer 4), or using the word layer and the sentence layer, since the documents can be reconstructed from the sentence layer. The network is a bidirectional network, since connections can be oriented from layer 1 to 2, 3, 4, from layer 2 to 3, 4, etc., as well as from layer 4 to 1, 2, 3, from layer 3 to 1, 2, etc.

Thus, the structure as shown in FIG. 1 is generated, which functions as described above and in U.S. patent application Ser. No. 11/468,048, entitled NEURAL NETWORK FOR ELECTRONIC SEARCH APPLICATIONS, Filed: Aug. 29, 2006, which is incorporated herein by reference in its entirety.

On a somewhat more general level, the question of how to define context particularly for annotating documents, within the framework on the neural network can be addressed by any of:

(1) Keywords
(2) Fragments of text (e.g., sentences, paragraphs, portions of documents)
(3) Documents A problem in the search industry that is closely related to visualization of search results and context-based searching is the problem of identifying keywords and annotations that can be used to define the context of the search. In other words, the question that arises upon encountering a document is: "what is this document about?" In particular, the problem is that what the document is "about" may not necessarily be summarized by a single word that is actually found in the document. For example, consider the case of Boeing Aircraft Co. coming out with a new airliner, the Boeing 787 Dreamliner. The user may be interested in the subject of sales of Boeing aircraft, and how these sales compared to comparable sales of Airbus aircraft. Therefore, the user is looking for documents that are "about" sales of Boeing 787s, perhaps sales of the Airbus A350, and possibly the competition between the two manufacturers.

However, documents that discuss sales of Boeing aircraft might not necessarily mention the word "sale." Other synonymous and partially synonymous words can be used, such as "purchased," "bought," "signed contracts," "signed a letter of understanding," "agreed to add to their fleet" (when talking about an airline), etc. Thus, limiting the search to documents that only discuss "Boeing 787" and "sale" would miss a large number of potentially useful documents that are "about" sales of the Boeing 787. On the other hand, adding all the words that are either synonyms, or closely related to the words "sale" ("signed a letter of intent," "signed a contract," etc.) would dramatically expand the number of results (hits), and will likely include a very large number of irrelevant documents.

Also, not every relevant document that discusses the sales of the 787 necessarily mentions the number "787" or the word "Dreamliner." A reader, reading about a newly launched Boeing aircraft in the 2005 time frame would presumably "know" that the aircraft at issue is the Boeing 787. Therefore, such a document is also "about" what the user is looking for, even though it might not contain the keywords "787" or "Dreamliner."

The problem, therefore, is how to help the user identify the keywords that are necessary for searching for those documents that are "about" his query, and how to construct a hierarchy of some sort of relevant keywords, where some of the keywords can be viewed, in some sense, as being more relevant than others, for purposes of annotation generation.

Furthermore, the problem of keyword identification also works in the reverse direction. Consider a number of documents, where the user would like to know what the documents are about. In other words, the user starts out with a "clean slate," knowing nothing about the documents except that the documents exist. For a large number of documents, the user therefore would like to know that some of those documents are about X, some are about Y, and some are about Z. Therefore, working from the direction of documents in the direction of keywords, the problem can be framed in the form of identifying what the documents are "about" and selecting the keywords from the documents that most closely convey the meaning of the documents, so that documents similar in "meaning" can be found. An example of an approach to identifying keywords is described in, e.g., U.S. Provisional Patent Application No.: 60/722,412, filed on Oct. 3, 2005, entitled USE OF NEURAL NETWORKS FOR KEYWORD GENERATION, which is incorporated herein by reference in its entirety.

Furthermore, in addition to knowing what the documents are "about," the user often needs to find other relevant documents. These may be documents "very similar to this one," documents that are "like this one," documents that are "not like this one", etc. The user would like to find not just documents that are similar in the sense of containing quotations of identical material, but similar in meaning and context.

As one example, the user may be expressly NOT interested in sales of model Boeing 787 airplanes, or sales of toys in the shape of Boeing 787 aircraft. Thus, documents that are "about" sales of toys, even if they mention the Boeing 787, are not relevant to the user, and need to be excluded.

Furthermore, the meaning of the document may be viewed in a narrow context, and a broad context. For example, an article discussing the sale of ten Boeing aircraft to a particular airline (e.g., Korean Airlines) has a narrow context of just that—the sale of ten aircraft to that particular airline. On the other hand, the broad context of the article may be the aircraft industry in general, the airline industry, international economics, etc. Similarly, a document generally discussing the history of aircraft development, which mentions the Boeing 787 (as one of many items) may be of interest to a user if his search is "broad," but may be of no interest to the user if the user is specifically looking for details of sales of a particular aircraft to particular airlines.

Initially, if no query input is specified, the neural network can be viewed, at its most basic level, as containing two types of neurons—the "word" neurons, and the "document" neurons, and a set of connections between them. With no query input, asking what the documents are about would generate a set of keywords that is essentially based on the frequency of occurrence of the words in the documents, and a general set of connections between the word neurons. As a query is propagated back and forth through the neural network, the keywords produced by the neural network will change.

The search query can be in the form of a group of words, sentences, paragraphs, or documents. By inputting a query along the lines of "Boeing 787 sale contract," the relative importance of words and concepts associated with these terms will increase, and the relative importance of others, unconnected to these words will decrease. Given a set of documents that are represented by the document layer neurons, those neurons that represent documents that are "like this one," or "related to this one," will be identified to the user (e.g., by their position in a visualization construct, such as described in U.S. Provisional Patent Application No. 11/468, 692, entitled CONTEXT-BASED SEARCH VISUALIZATION USING NEURAL NETWORKS, Filed: Aug. 30, 2006, which is incorporated herein by reference in its entirety, as being more relevant, and others as less relevant.

The user can then indicate, using the visualization constructs (i.e., icons, map, etc.), that some of the documents found (documents about model 787 airplanes, or documents about Boeing 787 toys) are not relevant to the user. Therefore, the neural network, through the mechanism of the neurons transmitting their level of activity along their connections to other neurons, will produce a new set of annotations, based on the fact that those neurons associated with toys and model airplanes will be inhibited.

The user, through excitation of some of the neurons that he considers relevant (for example, by indicating graphically, or with a mouse, that this particular neuron (for instance, "signed a contract for purchase") is relevant to the query, and that a particular neuron ("model airplane," "toy") is not relevant, can both excite new neurons, and inhibit already excited neurons. This is somewhat similar to searching for documents, the primary difference being that conceptually, the user is focused on the intermediate layer of concepts ("Boeing 787 Dreamliner," "sale," "signing a contract," "purchase," and "agreements to buy aircraft"). The generation of proper keywords is therefore a useful tool for finding documents that are in the proper context (i.e., related to the "meaning" of the documents) and which the user seeking, rather than merely containing the keywords that the user originally comes up with (which can result in an output from conventional search engines that is both over- and under-inclusive).

The problem of annotating the search results can thus essentially be framed in terms of how to identify the sentences in the documents that most closely relate to the "meaning" of the document. This is, a fact, a fairly complex problem because the actual meaning of the document is not necessarily represented by any particular set of keywords. An identified document may in fact contain only a handful of the words in a search query, but nonetheless be highly relevant to the query's context.

Another problem is how to manage the size of the annotations. Typically, the annotations should consist of few enough sentences, such that a reader can quickly read them and understand what the document is about, but a sufficient number of sentences to actually enable the reader to sufficiently grasp the meaning of the document from reading the annotation. The purpose of the annotations is therefore to give the user an ability to do a quick read of the sentences in order to understand what the document is "about."

With the above discussion in mind, the problem of generating annotations using a neural network can therefore be addressed. Treating, conceptually, the entire neural network as a four-layer entity, with the layers being words, objects, sentences and documents, the focus is therefore on the sentence layer, such that the objective is to identify which of the neurons of the sentence layer are the most relevant. It should be noted that sentence fragments and/or paragraphs can be treated in the same manner, or analogously, to sentences. For example, incomplete sentences can be assigned their own neurons as well.

The approach described herein produces annotations that are context-based, and optionally also query-based. At a minimum, the annotations produced should be closely related to the meaning of the document (contrast this with the example above of the article that, in an endnote, mentions the subject matter of the next article). Therefore, the neural network shown in FIG. 1 can be utilized to identify the most relevant sentences. The sentence layer of the network contains neurons that correspond to every sentence in the document (assuming for the moment that only a single document in layer four is identified by the user as relevant, although the process works identically for multiple documents).

Of relevance to the discussion is an empirical observation that 90% of the "meaning" of the document is typically contained in 40-50% of the sentences. All the sentences of the document (100% of the sentences) by definition contain 100% of the meaning of the document. However, most documents contain, broadly speaking, two types of sentences: sentences that present "facts," and sentences that "explain the facts." Another empirical observation is that sentences that present facts generally provide better annotations then sentences that explain those facts. An alternative way to frame this observation is by saying that many more sentences that only explain, or interpret, the facts can be "discarded," compared to sentences that only present the facts, and yet the remaining sentences will still provide the user with relevant annotations.

The neural network of FIG. 1 can be used to generate annotations that are relevant to the context of the search query. This is particularly useful for documents that are "about" multiple subjects. For example, a document can discuss both politics and sports. The user might only be interested in a sports-related subject (however, the document might still be highly relevant to the user's query). In this case (for documents that simultaneously relate to multiple subjects) the neural network should not provide any sentences that relate only to politics as annotations, but should provide sentences that relate to the subject of sports.

Figure 2A:
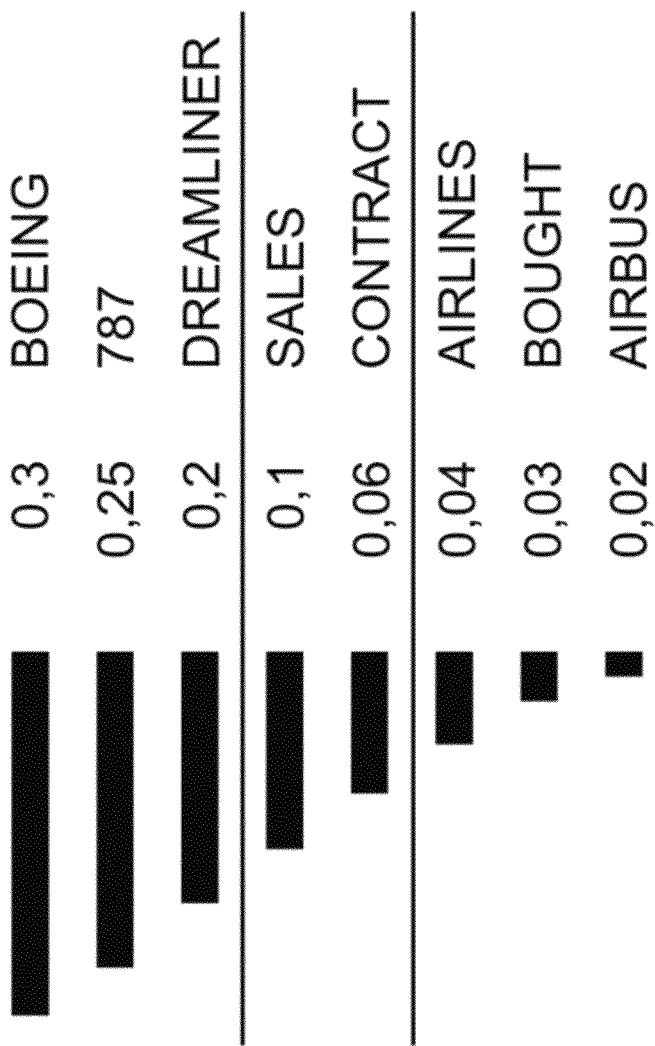

FIG. 2A illustrates an example of how neuron activity level is used initially to identify keywords in a document, which can be a first step in generating annotations. All the words in a document collectively have a "meaning" of 100%. FIG. 2A shows a simplified example, with only 8 words, which collectively have a level of activity that adds up to 1.0 (100%). The level of activity of each neuron represents relevance of that neuron to the document. Thus, the relevance of the top three neurons adds up to 0.75—i.e., 75% of the "meaning" of the document can be captured by the words BOEING, 787 and DREAMLINER.

The addition of two more words—SALES and CONTRACT brings the total "meaning" represented by these five words to 91% (in other words, 5 out of 8 words account for 95% of the meaning). Actual documents obviously contain many more words than this, but the principle is the same.

The same approach is used to identify sentences. All the sentences together represent 100% of the "meaning" (i.e., the sum of the activity of the neurons on the sentence layer that represents that document adds up to 1.0, or is re-normalized to 1.0 by the Activity Regulator), but a large percentage of the "meaning" can be represented by a much smaller percentage of the neurons.

Thus, annotations can be generated either without a context given by the user, or taking the context given by the user into consideration. In the first case, a neuron representing a document is activated. Using its connections (and given the relevance of the words of the document to the meaning of the document, as discussed above with reference to FIG. 2A), the document-neuron activates the word-neurons that it is connected to. Then, the word-neurons transmit the excitation level to the sentence layer. As a result, all the sentence layer neurons corresponding to the sentences of this document will be activated, and their level of activity will correspond to the relevance of the sentence to the "meaning" of the document. Then, the sentences that are most important are selected, based on some criteria, such as maximum number of sentences, or percentage of sentences, or both.

Figure 2B:
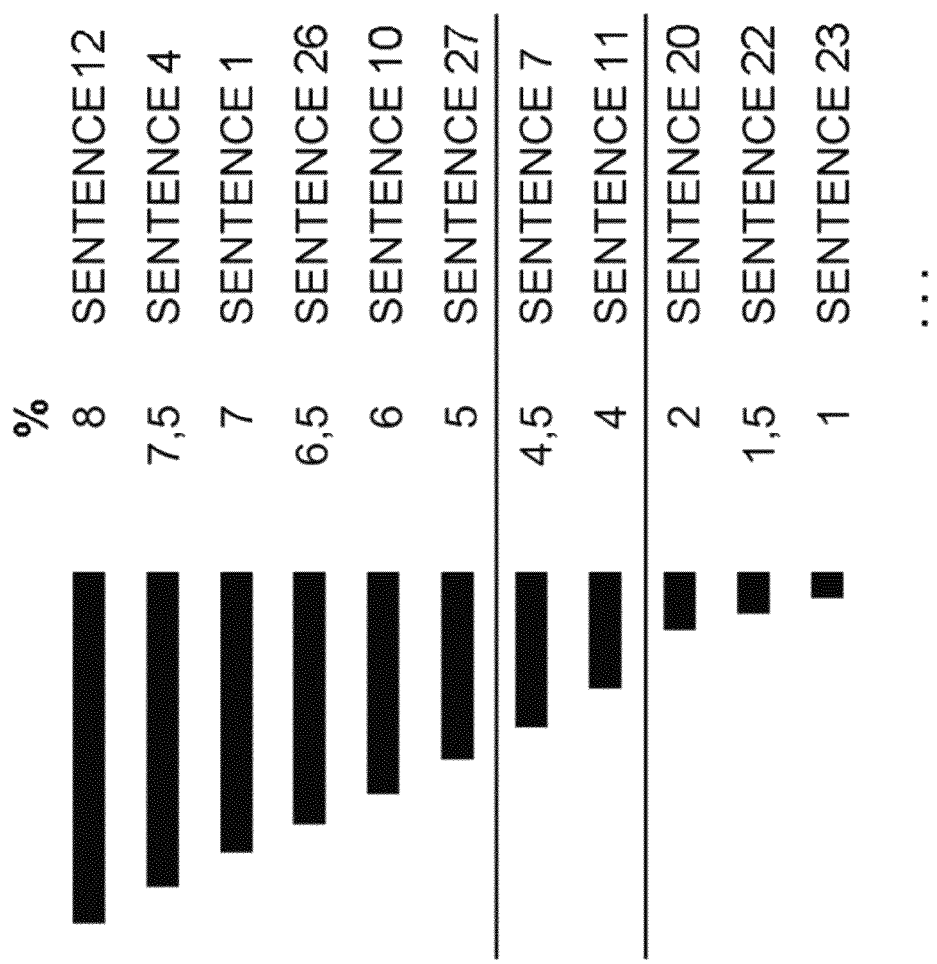

It is believed that the optimum approach is to select some percentage of sentences based on the percentage of the overall relevance (level of activity) associated with their neurons (e.g., 30% of the total level of activity of the sentence-neurons, 50%, etc.), although it is preferable to present them in the order that the sentences are found in the document (see, e.g., FIG. 2B, also discussed below). (This is to be contrasted with providing some predefined percentage of the sentences.) This permits forming annotations that are equally informative regardless of the size of the document. Given that most documents contain a certain "core" of factual information and a certain amount of discussion, interpretation or explanation of that factual information, it is therefore possible to identify only the sentences that make up the "core."

Another option is to use user-defined context. The user can specify the context by keywords, sentences, or by identifying a document (or documents) he considers particularly relevant to his query (and/or by identifying documents that he does NOT consider relevant). Therefore, the activity level of the sentence-neurons will be based not just on their relevance to the "meaning" of the document, but also on their relevance to the user's query.

The following example illustrates the difference between conventional annotations and the annotations produced by the approach described herein. Consider a search using query keywords: Boeing, Korean air, airplanes, order. One of the documents identified by a search using this query is a news release by Boeing at http://www.boeing.com/news/releases/2005/q2/nr_050411h.html. The entire text of the news release is as follows:

> Korean Air Joins Boeing 787 Family with up to 20-Airplane Order
>
> These images are available for editorial use by news media on boeingmedia.com
>
> NOTE: BCA photo release images are available on boeingmedia for 12 months from their release date.
>
> SEOUL, Apr. 11, 2005—The Boeing Company [NYSE: BA] and Korean Air Lines Co., Ltd. today announced an order for up to 20 Boeing 787 Dreamliners in a deal worth approximately $2.6 billion at list prices. The agreement involves 10 firm orders and options for 10 additional 787s. Delivery of the 787-8 airplanes will begin in 2009 and extend through 2013.
>
> "The Boeing 787 Dreamliner will enhance Korean Air's fleet with its flexibility for both regional and long-haul operations," said Y. H. Cho, Korean Air chairman and chief executive officer. "Our passengers will enjoy the benefits of the 787's new cabin environment and passenger amenities. The 787 will help us realize our goals of being one of the world's top ten passenger airlines by 2010 and to reduce our costs by 10 percent."
>
> As a member of the 787 launch customer team, Korean Air becomes a key partner in developing the 787 family of airplanes. Boeing has received 203 orders and commitments from 17 customers for the 787 since launching the technologically advanced jetliner less than a year ago.
>
> "Korean Air's selection of the 787 continues the steady drumbeat of orders for this remarkable new airplane," said Larry Dickenson, vice president of Sales—Boeing Commercial Airplanes. "The superior efficiency, reliability and passenger comfort of the 787 will greatly complement Korean Air's highly profitable 777 and 747 operations. Korean Air is one of the world's most progressive and vibrant carriers, and we are honored by its choice of the 787."
>
> The 787 will use 20 percent less fuel than today's airplanes of comparable size and will provide operators with up to 45 percent more cargo revenue capacity. Passengers will enjoy an innovative new interior environment with higher humidity, wider seats and aisles, larger windows, and other conveniences.
>
> The 787 is a family of airplanes carrying 200 to 300 passengers on routes between 3,500 and 8,500 nautical miles (6,500 to 16,000 kilometers). The 787 will allow airlines to offer more of what passengers want: affordable, comfortable, nonstop, travel to more destinations. The 787 is capable of nonstop routes connecting Seoul with Jakarta, Dallas, Rome or Tel Aviv.
>
> In addition to bringing big-jet ranges to mid-size airplanes, the 787 will fly at Mach 0.85, as fast as today's fastest commercial airplanes, while using much less fuel. Also, for the first time in commercial jet history, the 787 will offer a standard engine interface for its two types of engines, the General Electric GENX (GE Next Generation) and Rolls Royce's Trent 1000, allowing a 787 to be fitted with either manufacturer's engines at any point in time. Korean Air has not announced its 787 engine selection.
>
> The 787 was launched in April 2004 with an ANA (All Nippon Airways) firm order for 50 airplanes. Production will begin in 2006. First flight is expected in 2007 with certification, delivery and entry into service in 2008.
>
> In 2004, Korean Air and Boeing celebrated the airline's 100th Boeing jetliner delivery. Since receiving its 707, Korean Air has operated several Boeing models, including the Next-Generation 737, 747, 777, DC-9, DC-10, MD-11, and MD-80. McDonnell Douglas, which is now part of Boeing, provided the latter four products.

Using a setting of 40% (i.e., sentences that collectively contain 40% of the total activity of the neurons), the neural network produces the following annotations:

> Korean Air Joins Boeing 787 Family with up to 20-Airplane Order SEOUL, Apr. 11, 2005—The Boeing Company [NYSE: BA] and Korean Air Lines Co., Ltd. today announced an order for up to 20 Boeing 787 Dreamliners in a deal worth approximately $2.6 billion at list prices. As a member of the 787 launch customer team, Korean Air becomes a key partner in developing the 787 family of airplanes.
>
> "Korean Air's selection of the 787 continues the steady drumbeat of orders for this remarkable new airplane," said Larry Dickenson, vice president of Sales—Boeing Commercial Airplanes.
>
> In 2004, Korean Air and Boeing celebrated the airline's 100th Boeing jetliner delivery.
>
> Since receiving its 707, Korean Air has operated several Boeing models, including the Next-Generation 737, 747, 777, DC-9, DC-10, MD-11, and MD-80.

Modifying the keywords as follows: "Boeing, Korean air, airplanes, order, family," and a setting of 50%, produces the following annotations:

> Korean Air Joins Boeing 787 Family with up to 20-Airplane Order SEOUL, Apr. 11, 2005—The Boeing Company [NYSE: BA] and Korean Air Lines Co., Ltd. today announced an order for up to 20 Boeing 787 Dreamliners in a deal worth approximately $2.6 billion at list prices.
>
> "The Boeing 787 Dreamliner will enhance Korean Air's fleet with its flexibility for both regional and long-haul operations," said Y. H.
>
> As a member of the 787 launch customer team, Korean Air becomes a key partner in developing the 787 family of airplanes.
>
> "Korean Air's selection of the 787 continues the steady drumbeat of orders for this remarkable new airplane," said Larry Dickenson, vice president of Sales—Boeing Commercial Airplanes.
>
> "The superior efficiency, reliability and passenger comfort of the 787 will greatly complement Korean Air's highly profitable 777 and 747 operations.
>
> In 2004, Korean Air and Boeing celebrated the airline's 100th Boeing jetliner delivery.
>
> Since receiving its 707, Korean Air has operated several Boeing models, including the Next-Generation 737, 747, 777, DC-9, DC-10, MD-11, and MD-80

The table below and FIG. 2B (which should be viewed together) illustrate the text of the source article, with the weights of the sentences:

| No. | Number of the sentence in the document | Weight | % of total "meaning" attributable to this sentence | Sentence text |
|---|---|---|---|---|
| 1 | 12 | ***************** | 0.08 | Korean Air's selection of the 787 continues the steady drumbeat of orders for this remarkable new airplane," said Larry Dickenson, vice president of Sales - Boeing Commercial Airplanes. |
| 2 | 4 | **************** | 0.075 | SEOUL, Apr. 11, 2005 - The Boeing Company [NYSE: BA] and Korean Air Lines Co., Ltd. today announced an order for up to 20 Boeing 787 Dreamliners in a deal worth approximately $2.6 billion at list prices. |
| 3 | 1 | ************** | 0.07 | Korean Air Joins Boeing 787 Family with up to 20-Airplane Order |
| 4 | 26 | ************ | 0.065 | In 2004, Korean Air and Boeing celebrated the airline's 100th Boeing jetliner delivery. |
| 5 | 10 | *********** | 0.06 | As a member of the 787 launch customer team, Korean Air becomes a key partner in developing the 787 family of airplanes. |
| 6 | 27 | ********* | 0.05 | Since receiving its 707, Korean Air has operated several Boeing models, including the Next-Generation 737, 747, 777, DC-9, DC-10, MD-11, and MD-80 |
| 7 | 7 | ******** | 0.05 | "The Boeing 787 Dreamliner will enhance Korean Air's fleet with its flexibility for both regional and long-haul operations," said Y. H. |
| 8 | 11 | ******* | 0.048 | "The superior efficiency, reliability and passenger comfort of the 787 will greatly complement Korean Air's highly profitable 777 and 747 operations. |
| 9 | 20 | ****** | 0.042 | In addition to bringing big-jet ranges to mid-size airplanes, the 787 will fly at Mach 0.85, as fast as today's fastest commercial airplanes, while using much less fuel. |
| 10 | 22 | **** | 0.038 | Korean Air has not announced its 787 engine selection. |
| 11 | 23 | *** | 0.035 | The 787 was launched in April 2004 with an ANA (All Nippon Airways) firm order for 50 airplanes. Production will begin in 2006. First flight is expected in 2007 with certification, delivery and entry into service in 2008. |

This should be compared to annotations generated by a conventional search engine (here, Google):

Korean Air Joins Boeing 787 Family with up to 20-Airplane Order

Korean Air Joins Boeing 787 Family with up to 20-Airplane Order.

FIG. 2C illustrates the process of generating annotations. In the initial step, three layers are usually involved—the word layer, the sentence layer, and the document layer (see (1) in FIG. 2C. The size of the circles and the degree of "blackness" correspond to relevance in this figure. In step (1), the document neuron activates the word neurons for each of the words present in the document. In step (2), the sentence neurons are activated, optionally additionally based on an input query (i.e., the annotations can also be query-context-based, or just document-context-based). In step (3), the sentence-neurons having the highest relevance are selected so that a certain threshold of "meaning" is presented (see horizontal lines in FIG. 2B). The process can continue iteratively, and use, as additional input queries, new keywords, new documents, or results from a search (whether using a neural network or from conventional search engines).

Furthermore, it should be noted that the approach described herein is applicable to any collection of documents, regardless of where they are stored. For example, it is applicable to documents stored on the local hard drive, on a corporate network, or on the Internet. Furthermore, the approach is highly scalable, substantially independent of the number of documents involved. In the case of a local hard drive, the documents at issue could be text files, word processing files, email files, attachments to emails, databases, etc.

Figure 3:
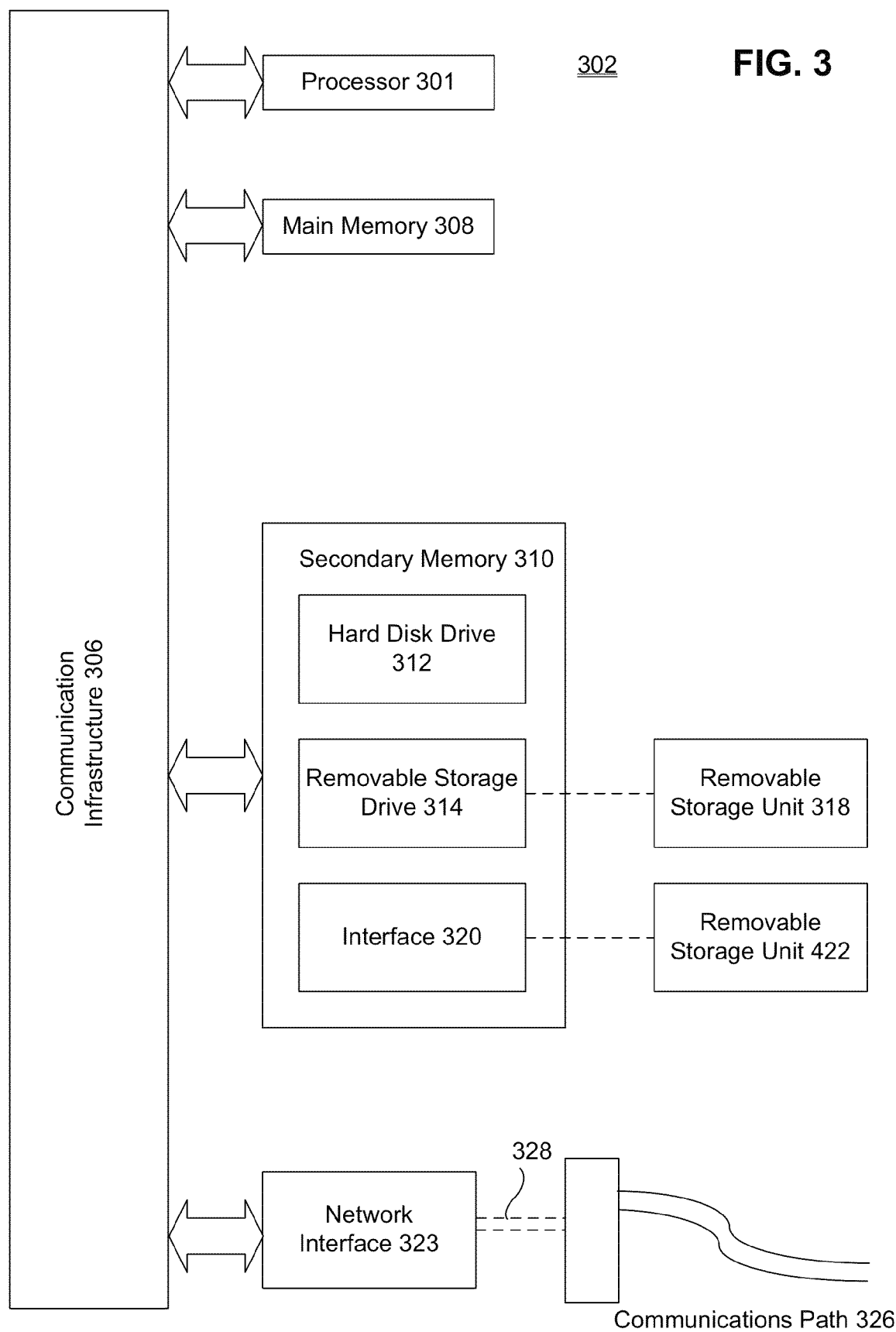
FIG. 3 illustrates an example of a computer system on which the neural network can be implemented.

An example of the computer 302 where the neural network can be implemented is illustrated in FIG. 3. The computer 302 includes one or more processors, such as processor 301. The processor 301 is connected to a communication infrastructure 306, such as a bus or network). Various software implementations are described in terms of this exemplary computer system. After reading this description, it will become apparent to a person skilled in the relevant art how to implement the invention using other computer systems and/or computer architectures.

Computer 302 also includes a main memory 308, preferably random access memory (RAM), and may also include a secondary memory 310. The secondary memory 310 may include, for example, a hard disk drive 312 and/or a removable storage drive 314, representing a magnetic tape drive, an optical disk drive, etc. The removable storage drive 314 reads from and/or writes to a removable storage unit 318 in a well known manner. Removable storage unit 318 represents a magnetic tape, optical disk, or other storage medium that is read by and written to by removable storage drive 314. As will be appreciated, the removable storage unit 318 can include a computer usable storage medium having stored therein computer software and/or data.

In alternative implementations, secondary memory 310 may include other means for allowing computer programs or other instructions to be loaded into computer 302. Such means may include, for example, a removable storage unit 322 and an interface 320. An example of such means may include a removable memory chip (such as an EPROM, or PROM) and associated socket, or other removable storage units 322 and interfaces 320 which allow software and data to be transferred from the removable storage unit 322 to computer 302.

Computer 302 may also include one or more communications interfaces, such as communications interface 324. Communications interface 324 allows software and data to be transferred between computer 302 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, an RF link and other communications channels. In an embodiment of the invention, signals 328 comprise data packets sent to processor 301. Information representing processed packets can also be sent in the form of signals 328 from processor 301 through communications path 326.

The terms "computer program medium" and "computer usable medium" are used to generally refer to media such as removable storage units 318 and 322, a hard disk installed in hard disk drive 312, and signals 328, which provide software to the computer 302.

Computer programs are stored in main memory 308 and/or secondary memory 310. Computer programs may also be received via communications interface 324. Such computer programs, when executed, enable the computer 302 to implement the present invention as discussed herein. In particular, the computer programs, when executed, enable the processor 301 to implement the present invention. Where the invention is implemented using software, the software may be stored in a computer program product and loaded into computer 302 using removable storage drive 314, hard drive 312 or communications interface 324.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. An apparatus comprising:
   a memory;
   a processor operatively coupled to the memory; and
   a neural network comprising:
      a plurality of word neurons;
      a plurality of sentence neurons;
      at least one document neuron;
      a plurality of first connections between at least a portion of the plurality of word neurons and the plurality of sentence neurons; and
      a plurality of second connections between at least a portion of the word neurons and the at least one document neuron, wherein the neural network is configured to excite a first sentence neuron of the plurality of sentence neurons in response to excitation of the at least one document neuron;
      wherein the processor is configured to change a position of the plurality of word neurons on a display based on an input, and wherein the change in the position of one word neuron changes annotation corresponding to at least one of the plurality of sentence neurons.

2. The apparatus of claim 1, wherein the plurality of word neurons are organized into an input layer that receives an input query.

3. The apparatus of claim 2, wherein at least some of the plurality of word neurons of the input layer have connections between one other.

4. The apparatus of claim 1, wherein the first sentence neuron has a highest relevance to document meaning based on a predetermined percentage of document meaning.

5. The apparatus of claim 4, wherein the predetermined percentage of document meaning is a degree of relevance of the first sentence neuron to the at least one document neuron.

6. The apparatus of claim 1, wherein the first sentence neuron represents an annotation of a document.

7. The apparatus of claim 1, wherein the neural network is a bidirectional neural network.

8. The apparatus of claim 1, wherein the processor is configured to receive an input query, and wherein the input query comprises one or more documents considered relevant by a user.

9. The apparatus of claim 1, wherein the processor is configured to receive the input, and wherein the input comprises a change in relevance of neurons relative to one other.

10. The apparatus of claim 1, wherein the processor is configured to receive the input, wherein the input comprises an indication of irrelevance of a sentence neuron, and wherein the indication of the irrelevance of the sentence neuron inhibits neurons of the neural network.

11. The apparatus of claim 1, wherein the processor is configured to regulate a sum of all activity of all active neurons of the neural network that are excited at any given time.

12. A method comprising:
   generating a plurality of word neurons;
   generating a plurality of sentence neurons;
   generating at least one document neuron, wherein the plurality of word neurons, the plurality of sentence neurons, and the at least one document neuron form at least a portion of a neural network;
   forming, with a processor of a computing device, a plurality of first connections between at least a portion of the plurality of word neurons and the plurality of sentence neurons;

forming, with the processor of the computing device, a plurality of second connections between at least a portion of the plurality of word neurons and the at least one document neuron;

exciting a first sentence neuron of the plurality of sentence neurons in response to excitation of the at least one document neuron; and changing a position of the plurality of word neurons on a display based on an input, and wherein the change in the position of one word neuron changes annotation corresponding to at least one of the plurality of sentence neurons.

13. The method of claim 12, wherein the first sentence neuron represents an annotation of a document.

14. The method of claim 12, wherein the neural network is a bidirectional neural network.

15. The method of claim 12, further comprising receiving an input query, wherein the input query comprises one or more documents considered relevant by a user.

16. The method of claim 12, further comprising organizing the plurality of word neurons into an input layer that receives an input query.

17. The method of claim 12, further comprising regulating a sum of all activity of all active neurons of the neural network that are excited at any given time.

18. A non-transitory computer-readable medium having computer-readable instructions stored thereon, wherein the computer-readable instructions comprise:

instructions to generate a plurality of word neurons;

instructions to generate a plurality of sentence neurons;

instructions to generate at least one document neuron, wherein the plurality of word neurons, the plurality of sentence neurons, and the at least one document neuron form at least a portion of a neural network;

instructions to form a plurality of first connections between at least a portion of the plurality of word neurons and the plurality of sentence neurons;

instructions to form a plurality of second connections between at least a portion of the plurality of word neurons and the at least one document neuron;

instructions to excite a first sentence neuron of the plurality of sentence neurons in response to excitation of the at least one document neuron; and instructions to change a position of the plurality of word neurons on a display based on an input, and wherein the change in the position of one word neuron changes annotation corresponding to at least one of the plurality of sentence neurons.

19. The non-transitory computer-readable medium of claim 18, further comprising instructions to organize the plurality of word neurons into an input layer that receives an input query.

20. The non-transitory computer-readable medium of claim 18, further comprising instructions to regulate a sum of all activity of all active neurons of the neural network that are excited at any given time.

21. The non-transitory computer-readable medium of claim 18, further comprising instructions to change a relevance of word neurons relative to one other in response to a received input.

* * * * *